United States Patent [19]

Isayama et al.

[11] 4,178,597

[45] Dec. 11, 1979

[54] COLOR INK JET PRINTING APPARATUS

[75] Inventors: Takuro Isayama; Hiromichi Komai, both of Tokyo, Japan

[73] Assignee: Ricoh Company, Ltd., Tokyo, Japan

[21] Appl. No.: 911,552

[22] Filed: May 31, 1978

[30] Foreign Application Priority Data

Jun. 6, 1977 [JP] Japan .......... 52-66554

[51] Int. Cl.2 .......... G01G 15/18

[52] U.S. Cl. .......... 346/75; 346/46; 358/75

[58] Field of Search .......... 346/75, 140 R, 46; 358/75, 78, 296

[56] References Cited

U.S. PATENT DOCUMENTS 1,709,926 4/1929 Weaver .......... 358/75

3,476,874 11/1969 Loughren .......... 358/75

3,956,756 5/1976 Paton .......... 346/75

*Primary Examiner*—Joseph W. Hartary

*Attorney, Agent, or Firm*—Frank J. Jordan

[57] ABSTRACT

First, second and third ink ejectors eject ink of three primary colors in superposition onto a sheet of paper being moved relative thereto in response to first, second and third electrical color signals respectively. Circuit means are provided to sense initiation and termination of the signals. Upon simultaneous initiation of one of the signals and termination of another of the signals, the circuit means delays ink ejection from the ejector corresponding to the signal which was initiated for a predetermined length of time. This prevents color mixing at the boundary of the colors which would produce an erroneous color.

6 Claims, 4 Drawing Figures

COLOR INK JET PRINTING APPARATUS

BACKGROUND OF THE INVENTION

The present invention relates to an improved color ink jet printing apparatus. An ink jet printer of the present type generally comprises an ink ejection head for ejecting three primary colors of ink onto a sheet of paper which is moved relative thereto. The ejection head comprises three ink ejectors for the respective colors which eject jets of colored ink in superposition onto the sheet in response to three respective electrical color signals. In other words, each ejector will eject ink as long as the respective signal is applied thereto.

Whereas color ink jet printers are practical and economical, a problem has remained heretofore unsolved. The problem is that erroneous colors are produced at the boundaries of two colors on the sheet, where one of the ejectors is shut off and another of the ejectors is turned on.

Due to lack of immediate absorption by the paper and/or diffusion through the paper fibers, mixing of ink occurs at such boundaries. For example, at a boundary between yellow and cyan printing areas on the sheet, mixing of the two colors of ink will produce a green line. The color green is erroneous since it is not designated by the color signals. Such erroneous colors at boundaries between designated colors substantially degrade the printing quality.

SUMMARY OF THE INVENTION

Such color mixing and production of unwanted colors at color boundaries is positively prevented in accordance with the present invention by circuit means which sense initiation and termination of the color signals. Upon simultaneous initiation of one of the signals and termination of another of the signals corresponding to a color change, the circuit means delays ink ejection from the ejector corresponding to the signal which was initiated for a predetermined length of time. This creates an area at the boundary void of both colors, which is filled by ink diffusion and the like without production of an erroneous color.

It is an object of the present invention to provide a color ink jet printing apparatus comprising novel circuit means for positively preventing formation of erroneous colors at boundaries between two designated colors.

It is another object of the present invention to provide a generally improved color ink jet printing apparatus.

Other objects, together with the foregoing, are attained in the embodiments described in the following description and illustrated in the accompanying drawing.

DESCRIPTION OF THE PREFERRED EMBODIMENTS

While the color ink jet printing apparatus of the invention is susceptible of numerous physical embodiments, depending upon the environment and requirements of use, substantial numbers of the herein shown and described embodiments have been made, tested and used, and all have performed in an eminently satisfactory manner.

Figure 1A:
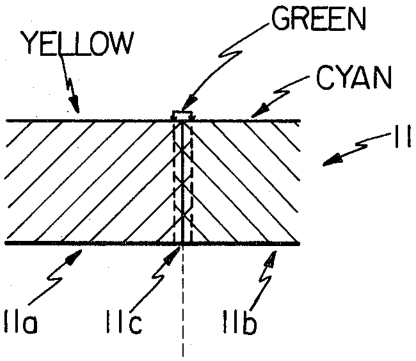
FIGS. 1*a* and 1*b* are diagrams for explaining the principles of the present invention.
Figure 1B:
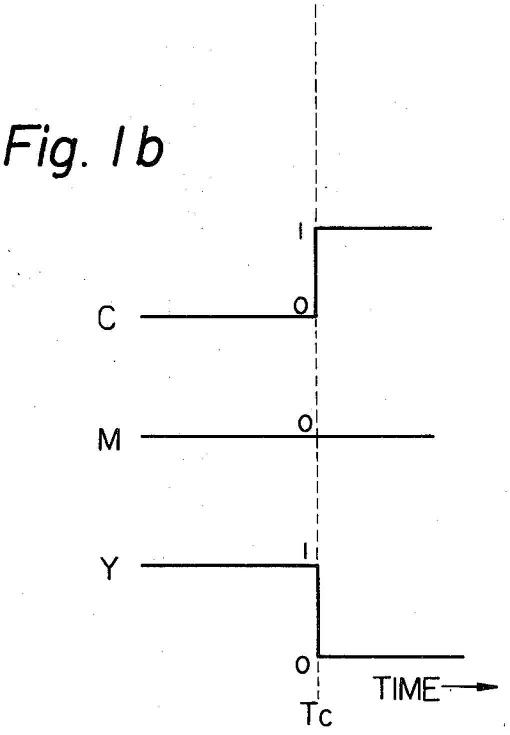

FIGS. 1*a* and 1*b* illustrate the principle of the present invention. In FIG. 1*a*, an ink jet printer forms a yellow area **11*a* and a cyan area 11*b* on a sheet of printing paper 11**. In this case, three primary colors, cyan, magenta and yellow are used for printing. As viewed in FIG. 1*b*, a yellow color signal Y is applied to a yellow ink ejector which will be described below up until a time Tc. Then, the yellow color signal Y is terminated and a cyan color signal C is initiated. A magenta color signal M is not applied in this example. The color change at the time Tc produces a boundary area **11*c* on the sheet 11 between the yellow and cyan areas 11*a* and 11*b* respectively. Due to mixing of the colored inks in the boundary area 11*c*, the color green is produced therein. This green color in the boundary area 11*c*** is objectionable and is erroneous since it was not designated by the color signals C, M and Y. This type of color mixing substantially degrades the quality of color ink jet printing.

Figure 2:
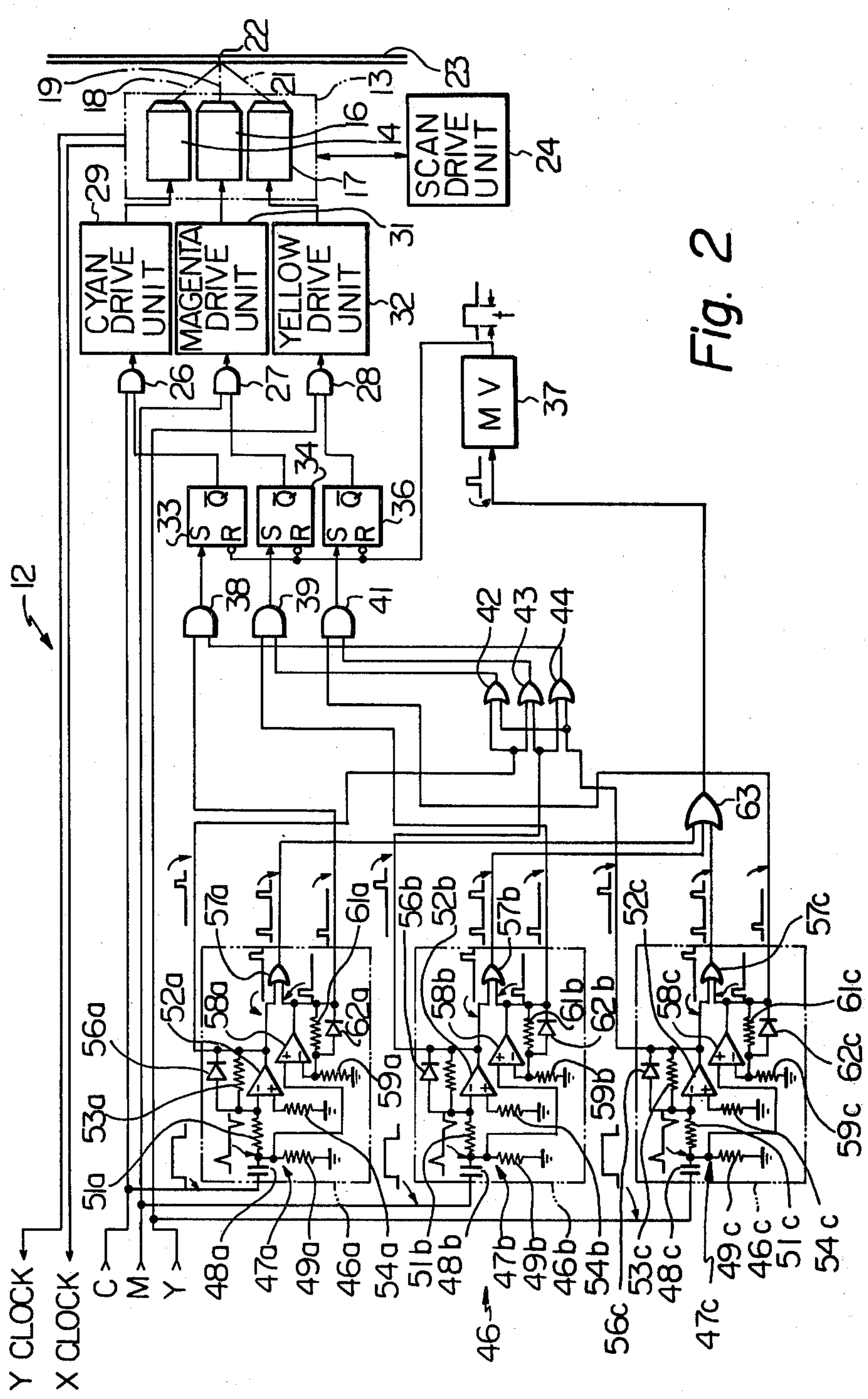
FIG. 2 is an electrical schematic diagram of a first embodiment of the present invention.

An ink jet printing apparatus of the present invention which is designed to overcome this problem is illustrated in FIG. 2 and designated as 12. The apparatus 12 comprises an ink ejection head 13 including three ink ejectors 14, 16 and 17 which are constructed to eject cyan, magenta and yellow ink jets 18, 19 and 21 in superposition onto a point 22 on a sheet 23 of paper in response to the color signals C, M and Y respectively. The sheet 23 is held stationary and scan drive unit 24 are provided to move the ink ejection head 13 relative thereto. The ink ejectors 14, 16 and 17 function to eject ink as long the respective signals C, M and Y are applied thereto. More specifically, horizontal drive clock pulses X are applied to the ejection head 13 and scan drive unit 24 causing the ejection head 13 to move relative to the sheet 23 in a stepwise manner. In response to each clock pulse X, the ejection head 13 is moved horizontally by one small increment. Prior to movement of the ejection head 13, the ejectors 14, 16 and 17 will eject a drop of ink onto the point 22 on the sheet 23 if the respective color signals C, M and Y are present. In other words, the ink jets 18, 19 and 21 are produced in the form of streams of drops as long as the respective signals C, M and Y are present. The Y clock pulses are used for vertical scan. One clock pulse Y is produced for each line of clock pulses X.

The signals C, M and Y are applied to inputs of AND gates 26, 27 and 28 respectively, the outputs of which are connected to cyan, magenta and yellow scan drive units 29, 31 and 32. The outputs of the drive units 29, 31 and 32 are connected to drive the ejectors 14, 16 and 17 respectively. Other inputs of the AND gates 26, 27 and 28 are connected to Q outputs of flip-flops 33, 34 and 36 respectively. The output of a monostable multivibrator 37 is connected to inverting reset inputs of the flip-flops 33, 34 and 36. Outputs of AND gates 38, 39 and 41 are connected to set inputs of the flip-flops 33, 34 and 36 respectively. Outputs of OR gates 42, 43 and 44 are connected to inputs of the AND gates 38, 39 and 41 respectively.

The apparatus 12 further comprises a transition detector 46 comprising three identical dectector units **46*a*, 46*b* and 46*c* which receive the signals C, M and Y respectively. The individual components of the units 46*a*, 46*b* and 46*c* are designated by the same reference numerals suffixed by the letters "a", "b" and "c" respectively, and only the components of the unit 46a** will be described in detail.

The unit 46a comprises a differentiator circuit 47a consisting of a capacitor 48a and a resistor 49a connected in series, with the resistor 49a being connected to ground. The signal C is applied to the capacitor 48a. The junction of the capacitor 48a and resistor 49a is connected through an input resistor 51a to an inverting input of an operational amplifier 52a which is arranged to function as an inverting amplifier. The non-inverting input of the operational amplifier 52a is grounded through a resistor 54a. A feedback resistor 54a is connected between the output and inverting input of the operational amplifier 52a. A diode 56a has its cathode connected to the output of the operational amplifier 52a and its anode connected to the inverting input thereof. The output of the operational amplifier 52a is connected to an output of an OR gate 57a.

The junction of the capacitor 48a and the resistor 49a is also connected directly to the non-inverting input of an operational amplifier 58a, which is arranged to function as a non-inverting amplifier. The inverting input of the operational amplifier 58a is grounded through a resistor 59a. A feedback resistor 61a is connected between the output and inverting input of the operational amplifier 58a. The cathode and anode of a diode 62a are connected to the output and inverting input respectively of the operational amplifier 58a. The output of the operational amplifier 58a is connected to another input of the OR gate 57a.

The outputs of the OR gates 57a, 57b and 57c are connected to inputs of an OR gate 63, the output of which is connected to the input of the multivibrator 37.

The outputs of the operational amplifiers 58a, 58b and 58c are connected to inputs of the AND gates 38, 39 and 41 respectively. The output of the operational amplifier 52a is connected to inputs of the OR gates 42 and 43. The output of the operational amplifier 52b is connected to inputs of the OR gates 43 and 44. The output of the operational amplifier 52c is connected to inputs of the OR gates 42 and 44.

In order for ink ejection to occur, the C, M and Y signals must be gated through the AND gates 26, 27 and 28 to the drive units 29, 31 and 32 respectively. The AND gates 26, 27 and 28 are normally enabled by the high Q outputs of the flip-flops 33, 34 and 36 when the flip-flops are in the low or reset states.

Taking for example the unit 46a, the differentiator circuit 47a produces at the junction of the capacitor 48a and the resistor 49a positive and negative spike in response to the leading and trailing edges respectively of the signal C, or in response to initiation and termination of the signal C. The output of the differentiator circuit 47a is inverted by the operational amplifier 52a which is biased to square the spikes. Due to the action of the diode 56a, only the negative spike produced at the trailing edge of the signal C appears at the output of the operational amplifier 52a in inverted form as a positive pulse. The positive spike produced at the leading edge of the signal C is suppressed due to forward biasing and conduction of the diode 56a.

The operational amplifier 58a produces at its output a positive pulse corresponding to the leading edge of the signal C, the negative spike produced at the trailing edge of the signal C being suppressed due to forward biasing and conduction of the diode 62a. It will be recalled that the operational amplifier 58a does not invert the input signal.

The outputs of the operational amplifiers 52a and 58a are gated through the OR gate 57a and OR gate 63 to the multi-vibrator 37. It will be noted that the output of the OR gate 57a consists of two positive pulses produced at the leading and trailing edges respectively of the color signal C. The detectors 46b and 46c operate in an identical manner on the signals M and Y.

The leading edge of the signal C will produce a pulse output from the operational amplifier 58a which is applied to the input of the AND gate 38. Assuming that the other input of the AND gate 38 is high, the signal will be gated through the AND gate 38 to the set input of the flip-flop 33 to set the same. The Q output of the flip-flop 33 will go low, inhibiting the AND gate 26. Thus, the signal C will not be gated through the AND gate 26 to the cyan drive unit 29 and the ejector 14 will not eject cyan ink even though the signal C has been generated.

It will be seen that the outputs of the operational amplifiers 52b and 52c are connected to the inputs of the OR gate 44, the output of which is connected to the other input of the AND gate 38. Positive pulses appear at the outputs of the operational amplifiers 52b and 52c in response to the trailing edges of the signals M and Y. Therefore, the input of the AND gate 38 which is connected to the output of the OR gate 44 will only be high during termination of the signals M and Y respectively. If neither of the signals M and Y is terminated at the same time the signal C is initiated, the output of the AND gate 38 will remain and the flip-flop 33 will remain reset. The high Q output of the flip-flop 33 will enable the AND gate 26 and the signal C will be applied to the drive unit 29 for ink ejection. In summary, the flip-flop 33 will be set to inhibit the AND gate 26 only if the signal C is initiated in simultaneity with termination of either the signal M or the signal Y. If the signal C is initiated simultaneously with initiation of either the signal M or Y, the signal C is gated straight through the AND gate 26. If the signal C is initiated and there is no change in the signals M and Y, the signal C is gated straight through the AND gate 26.

Assuming that the signal C was initiated and that one of the signals M and Y was terminated simultaneously, the flip-flop 33 will be set and the AND gate 26 inhibited as mentioned above. The output pulse from the operational amplifier 58a which was gated through the AND gate 38 to set the flip-flop 33 is also gated through the OR gates 57a and 63 to trigger the multivibrator 37. The multivibrator 37 produces positive pulse for a length of time t which is applied to the inverting reset inputs of the flip-flops 33, 34 and 36. The leading edge of the pulse has no effect on the flip-flops 33, 34 and 36. However, the trailing edge of the pulse is inverted by the reset input of the flip-flop 33 to reset the same. The Q output of the flip-flop 33 goes high, enabling the AND gate 26. The flip-flop 33 is set for the length of time t, and thereby inhibits the AND gate 26 for the time t. In other words, the ejector 14 is inhibited for the length of time t after initiation of the signal C.

Assuming that the signal Y was terminated in simultaneity with initiation of the signal C, the effect of inhibiting the signal C for the time t may be understood with reference being made to FIG. 1a. Due to movement of the sheet 23, the boundary between the yellow and cyan areas will not be green as shown in FIG. 1a but will, assuming that there is no diffusion of ink, be blank (white). However, since in actual practice the diffusion of ink which produces the undesired green area in FIG. 1*a* does occur, in accordance with the prsent invention the blank area will be filled in with yellow and cyan ink diffused from the left and right sides of the boundary respectively. The density of the yellow and cyan ink tapers off toward the center of the boundary area, and there is no mixing of ink. The result is very aesthetic blending in the transition from the yellow area to the cyan area.

Examination of the drawing will disclose that the operation is analogous for initiation of the signals M and Y and simultaneous termination of either of the other signals. In other words, ink ejection of the color corresponding to the signal which is initiated is inhibited for the length of time t only if one of the other signals is simultaneously terminated.

Although not illustrated, the multivibrator 37 is provided with a variable resistor or the like (not shown) for varying the length of time t. The time t is set by observing the appearance of the printed copy, and is preferably set to the minimum value at which color mixing at the boundaries will not occur. Once set during manufacture, the time t is not changed in service.

It is clear that the multivibrator 37 may be replaced by an resistance-capacitance time constant circuit combined with a threshold detector, or any other circuitry capable of functioning as a timer. For example, a counter may be reset by an output pulse from the OR gate 63 and incremented by the clock pulses X. As a predetermined number of pulses X occurs during the time t, the flip-flops 33, 34 and 36 may be reset after the predetermined number of pulses X have been counted.

Figure 3:
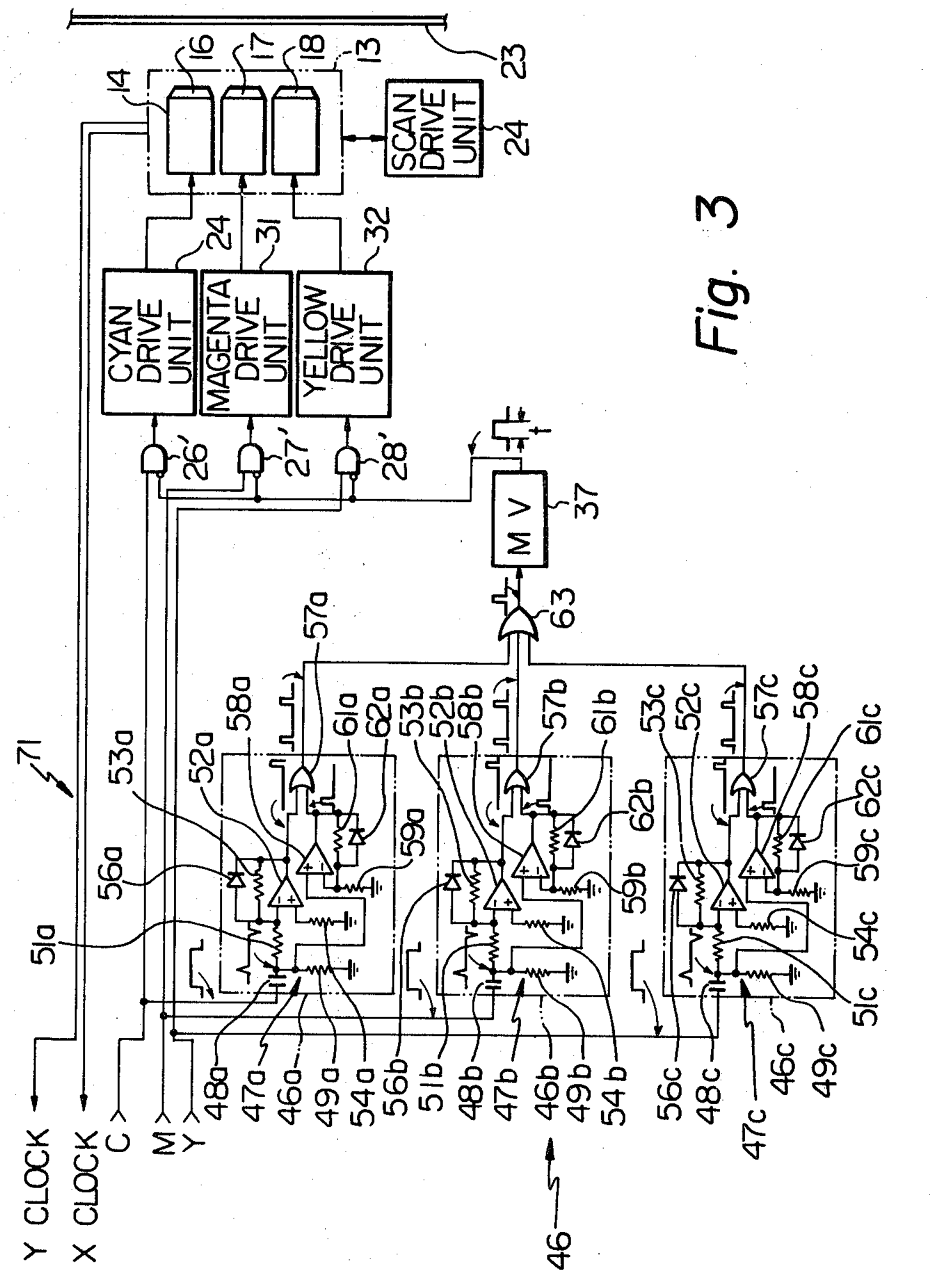
FIG. 3 is an electrical schematic diagram of a second embodiment of the present invention.

A simplified version of the apparatus 12 is illustated in FIG. 3 and designated as 71. Like elements are designated by the same reference numerals. The apparatus 71 is identical to the apparatus 12 except that the AND gates 38, 39 and 41, OR gates 42, 43 and 44 and flip-flops 33, 34 and 36 are omitted. The output of the multivibrator 37 is connected to inputs of AND gates 26', 27' and 28' which are identical to the AND gates 26, 27 and 28 except that the output of the multivibrator 37 is connected to inverting inputs thereof.

The apparatus 71 functions to inhibit ejection from all of the ejectors 14, 16 and 17 for the length of time t after initiation or termination of any of the signals, C, M or Y irrespective of the other signals. The AND gates 26', 27' and 28' are normally enabled by the low output of the multivibrator 37, thereby gating the signals C, M and Y therethrough respectively. However, any pulse output of the OR gate 63 will trigger the multivibrator 37 which produces a high output for the length of time t in response thereto. The high output of the multivibrator 37 inhibits all of the AND gates 26', 27' and 28' and thereby the ejectors 14, 16 and 17 for the length of time t.

The result is that a blank boundary area is created by any change in color, corresponding to initiation or termination of any of the color signals C, M or Y. Due to diffusion of the ink, the blank boundary area is filled in and is hardly noticeable.

It will be understood that an erroneous color is produced in a boundary area only when two primary colors change simultaneously in such a manner that one is initiated while the other is terminated. Where ejection of one ink color is initiated or terminated while there is no change in the other colors, the result is merely a blending of color at the boundary which is not objectionable.

The embodiment of FIG. 2 creates blank boundary areas to be filled in by ink diffusion only where color mixing to produce an erroneous color would otherwise result. Whereas the apparatus 12 comprises more complicated circuitry, it produces sharper color transitions at boundaries which do not involve initiation of one color and termination of another color. On the other hand, the apparatus 71 is simpler and less expensive to manufcture. However, color transitions will not be as sharp. The apparatus 12 inhibits ejection of only the color which is being initiated at a color boundary. The apparatus 71 inhibits ejection of all colors at a color boundary.

In summary, it will be seen that the present invention positively overcomes the problem of production of erroneous colors at color boundaries which has remained heretofore in the art.

Various modifications will become possible for those skilled in the art after receiving the teachings of the present disclosure without departing from the scope thereof. For example, it may not be desirable in some applications to completely inhibit ink ejection for the time t. Instead, the amount of ink ejection may be reduced. This may be accomplished by reducing the ejection volume per drop or by constricting the ejectors to eject a finer spray, for example.

What is claimed is:

1. An ink jet printing apparatus comprising:

a first ink ejector for ejecting a first ink jet of a first color onto a sheet in response to a first electrical signal;

a second ejector for ejecting a second ink jet of a second color onto the sheet in superposition with the first ink jet in response to a second electrical signal;

drive means for producing relative movement between the first and second ink ejectors and the sheet; and circuit means for sensing simultaneous initiation of the first signal and termination of the second signal and reducing an amount of ink ejection from the first ejector for a predetermined length of time in response thereto; the circuit means further sensing simultaneous initiation of the second signal and termination of the first signal and reducing an amount of ink ejection from the second ejector for the predetermined length of time in response thereto.

2. An apparatus as in claim 1, in which the circuit means is further constructed to reduce the amount of ink ejection from the first and second ejectors for the predetermined length of time in response to initiation and termination of the first signal irrespective of the second signal and in response to initiation and termination of the second signal irrespective of the first signal.

3. An apparatus as in claim 1, in which the circuit means is constructed to inhibit ink ejection from the first and second ejectors for the predetermined length of time.

4. An apparatus as in claim 1, in which the circuit means comprises differentiator means for differentiating the first and second signals to produce pulse signals upon initiation and termination thereof and pulse generator means triggered by the pulse signals to produce an ink ejection reduction signal for the predetermined length of time in response to each pulse signal.

5. An apparatus as in claim 4, further comprising first gate means connected between the pulse generator means and the first and second ejectors.

6. An apparatus as in claim 5, further comprising second gate means connected between the differentiator means and the first and second ejectors.

* * * * *